US008864580B2

(12) United States Patent
Gagner et al.

(10) Patent No.: US 8,864,580 B2

(45) Date of Patent: Oct. 21, 2014

(54) REMOTE INPUT DEVICE FOR A WAGERING GAME

(75) Inventors: Mark B. Gagner, West Chicago, IL (US); Larry J. Pacey, Chicago, IL (US); Richard T. Schwartz, Chicago, IL (US); Shridhar P. Joshi, Naperville, IL (US)

(73) Assignee: WMS Gaming Inc., Waukegan, IL (US)

( * ) Notice: Subject to any disclaimer, the term of this patent is extended or adjusted under 35 U.S.C. 154(b) by 507 days.

(21) Appl. No.: 12/438,514

(22) PCT Filed: Aug. 30, 2007

(86) PCT No.: PCT/US2007/019031

§ 371 (c)(1), (2), (4) Date: Feb. 23, 2009

(87) PCT Pub. No.: WO2008/027447

PCT Pub. Date: Mar. 6, 2008

(65) Prior Publication Data

US 2010/0240435 A1 Sep. 23, 2010

Related U.S. Application Data

(60) Provisional application No. 60/841,931, filed on Aug. 31, 2006, provisional application No. 60/858,627, filed on Nov. 13, 2006.

(51) Int. Cl.
*A63F 13/00* (2006.01)
*G07F 17/32* (2006.01)

(52) U.S. Cl.
CPC ............ *G07F 17/32* (2013.01); *G07F 17/3209* (2013.01)
USPC ................... 463/30; 463/16; 463/36; 463/37; 463/46; 463/47

(58) Field of Classification Search
USPC ........... 463/16, 20, 30–33, 40–42, 36, 37, 46, 463/47
See application file for complete search history.

(56) References Cited

U.S. PATENT DOCUMENTS

| | | | | |
|---|---|---|---|---|
| 4,467,424 | A | 8/1984 | Hedges et al. | 364/412 |
| 5,675,390 | A | 10/1997 | Schindler et al. | |

(Continued)

FOREIGN PATENT DOCUMENTS

| | | |
|---|---|---|
| EP | 0509386 | 10/1992 |
| GB | 2415916 | 1/2006 |
| WO | 03/027970 | 4/2003 |

OTHER PUBLICATIONS

PCT International Search Report for International Application No. PCT/US2007/019031 dated Apr. 15, 2008 (2 pages).

(Continued)

*Primary Examiner* — Ronald Laneau
*Assistant Examiner* — Ross Williams
(74) *Attorney, Agent, or Firm* — Nixon Peabody LLP

(57) ABSTRACT

An input device dedicated for use with a wagering game is displayed on a display device. The display device is remote from the input device and includes outcome images of a randomly selected outcome and input images associated with player inputs for the wagering game. The input device includes a player input-receiving area and an interface. The player input-receiving area has a plurality of input elements associated with respective functions of the wagering game. The input elements replicate the input images of the player inputs. The interface is coupled to the input elements and transmits signals in response to the player activating the input elements.

23 Claims, 9 Drawing Sheets

(56) References Cited

U.S. PATENT DOCUMENTS

| | | | | |
|---|---|---|---|---|
| 5,689,663 | A | 11/1997 | Williams | |
| 5,774,063 | A | 6/1998 | Berry et al. | |
| 5,886,697 | A | 3/1999 | Naughton et al. | |
| 5,899,506 | A | 5/1999 | Tseeng | |
| 5,909,183 | A | 6/1999 | Borgstahl et al. | |
| 5,999,808 | A | 12/1999 | LaDue | 455/412 |
| 6,211,870 | B1 | 4/2001 | Foster | |
| 6,306,038 | B1 | 10/2001 | Graves et al. | 463/40 |
| 6,527,638 | B1 | 3/2003 | Walker et al. | 463/25 |
| 6,846,238 | B2 * | 1/2005 | Wells | 463/39 |
| 6,935,952 | B2 | 8/2005 | Walker et al. | 463/25 |
| 7,066,815 | B2 | 6/2006 | Walker et al. | 463/23 |
| 7,083,517 | B2 | 8/2006 | Salerno | 463/29 |
| 7,112,138 | B2 | 9/2006 | Hedrick et al. | 463/29 |
| 7,198,571 | B2 | 4/2007 | LeMay et al. | 463/25 |
| 7,202,799 | B2 | 4/2007 | Hsu et al. | |
| 7,347,780 | B1 * | 3/2008 | Best | 463/37 |
| 7,936,253 | B2 | 5/2011 | Ishimoto et al. | |
| 8,054,294 | B2 | 11/2011 | Sakai et al. | |
| 2001/0017615 | A1 | 8/2001 | Lin et al. | |
| 2003/0156053 | A1 | 8/2003 | Wall et al. | |
| 2003/0176218 | A1 * | 9/2003 | LeMay et al. | 463/25 |
| 2004/0004603 | A1 | 1/2004 | Gerstner et al. | |
| 2004/0137987 | A1 * | 7/2004 | Nguyen et al. | 463/42 |
| 2005/0164789 | A1 * | 7/2005 | Nakamura et al. | 463/36 |
| 2006/0046849 | A1 | 3/2006 | Kovacs | 463/39 |
| 2008/0194323 | A1 * | 8/2008 | Merkli et al. | 463/30 |

OTHER PUBLICATIONS

PCT Written Opinion for International Application No. PCT/US2007/019031 dated Apr. 15, 2008 (5 pages).

* cited by examiner

REMOTE INPUT DEVICE FOR A WAGERING GAME

CROSS REFERENCE TO RELATED APPLICATIONS

This application is a U.S. national stage of International Application No. PCT/US2007/019031, filed Jun. Aug. 30, 2007, which is related to and claims priority to U.S. Provisional Application No. 60/841,931, filed Aug. 31, 2006, and U.S. Provisional Application No. 60/858,627, filed Nov. 13, 2006, each of which is incorporated herein its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to a remote input device for playing a wagering game on a display device.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

Players increasingly interact with video wagering content via touch screen devices and/or button-panel devices. As the industry of video wagering games grows, new distribution channels (e.g., TV, internet, handheld devices, mobile devices, etc.) are used to deliver the games to the players. Although the new distribution channels provide the players with familiar video wagering games, the players are not provided with a familiar device for interacting with the games. Thus, one problem associated with the new distribution channels is that players are required to use unfamiliar, or unconventional, devices for interacting with the wagering games.

For example, if a player wishes to use a TV set in a hotel room to play a wagering game, the player's sole device for interacting with the TV may likely be the TV remote control. A problem associated with using the TV remote control is that the player must figure out which functions of the wagering game are controlled by which buttons of the TV remote control. Thus, the player may have to figure out that the "Channel Up" button on the remote control may control the "Spin" function of a slots video wagering game. Even if the player figures out which buttons of the TV remote control are associated with which functions of the wagering game, another problem is that it provides the player with an unfamiliar playing experience. Specifically, the player must use the TV remote control—which is not dedicated to wagering games—to spin the reels of a slots gaming machine. The player's gaming experience is likely to be confusing and frustrating.

Thus, a need exists for a remote input device to control a display device when playing a wagering game. The present invention is directed to satisfying one or more of these needs and solving other problems.

SUMMARY OF THE INVENTION

According to one aspect of the present invention, an input device dedicated for use with a wagering game is displayed on a display device. The display device is remote from the input device and includes outcome images of a randomly selected outcome and input images associated with player inputs for the wagering game. The input device includes a player input-receiving area and an interface. The player input-receiving area has a plurality of input elements associated with respective functions of the wagering game. The input elements replicate the input images of the player inputs. The interface is coupled to the input elements and transmits signals in response to the player activating the input elements.

According to another aspect of the invention, a method for conducting a wagering game uses a remote input device dedicated for use with a wagering game. The wagering game is displayed on a display device and includes outcome images of a randomly selected outcome and input images associated with player inputs for the wagering game. The method includes activating an input element of the remote input device to perform an associated function of the wagering game. The input element replicates an input image of the player inputs. In response to the activating of the input element, a generated signal that is associated with the function of the wagering game is transmitted and the function is performed.

According to yet another aspect of the invention, a computer readable storage medium is encoded with instructions for directing a gaming system to perform the above method.

According to yet another aspect of the invention, a wagering system for allowing wagering games to be played remotely includes a wagering game interface, a display device, and a remote input device. The display device is external to a gaming establishment and displays images of a randomly selected outcome. The remote input device is coupled to the wagering game interface for playing the wagering game and includes a plurality of input touch keys and an interface area. The plurality of input touch keys replicate respective ones of a plurality of gaming touch keys. The gaming touch keys are associated with a gaming machine in the gaming establishment, each of the plurality of input touch keys activating an associated function of a corresponding gaming touch key. The interface area transmits signals associated with an activated function to the display device.

According to yet another aspect of the invention, an input device dedicated for use with a wagering game is displayed on a display device. The display device is remote from the input device and includes outcome images of a randomly selected outcome. The input device includes a player input-receiving area, an interface, and a menu area. The player input-receiving area has a first set of input elements associated with respective functions of a first wagering game and a second set of input elements associated with respective functions of a second wagering game. The first set of input elements and the second set of input elements replicate respective player input elements, the player input elements being integrated in one or more gaming machines located in a gaming establishment. The interface is coupled to the input elements for transmitting signals in response to the player activating one or more of the first set of input elements and the second set of input elements. The menu area is used for altering the player input-receiving area to show the first set of input elements when playing the first wagering game and the second set of input elements when playing the second wagering game.

Additional aspects of the invention will be apparent to those of ordinary skill in the art in view of the detailed description of various embodiments, which is made with reference to the drawings, a brief description of which is provided below.

DETAILED DESCRIPTION

Figure 1A:
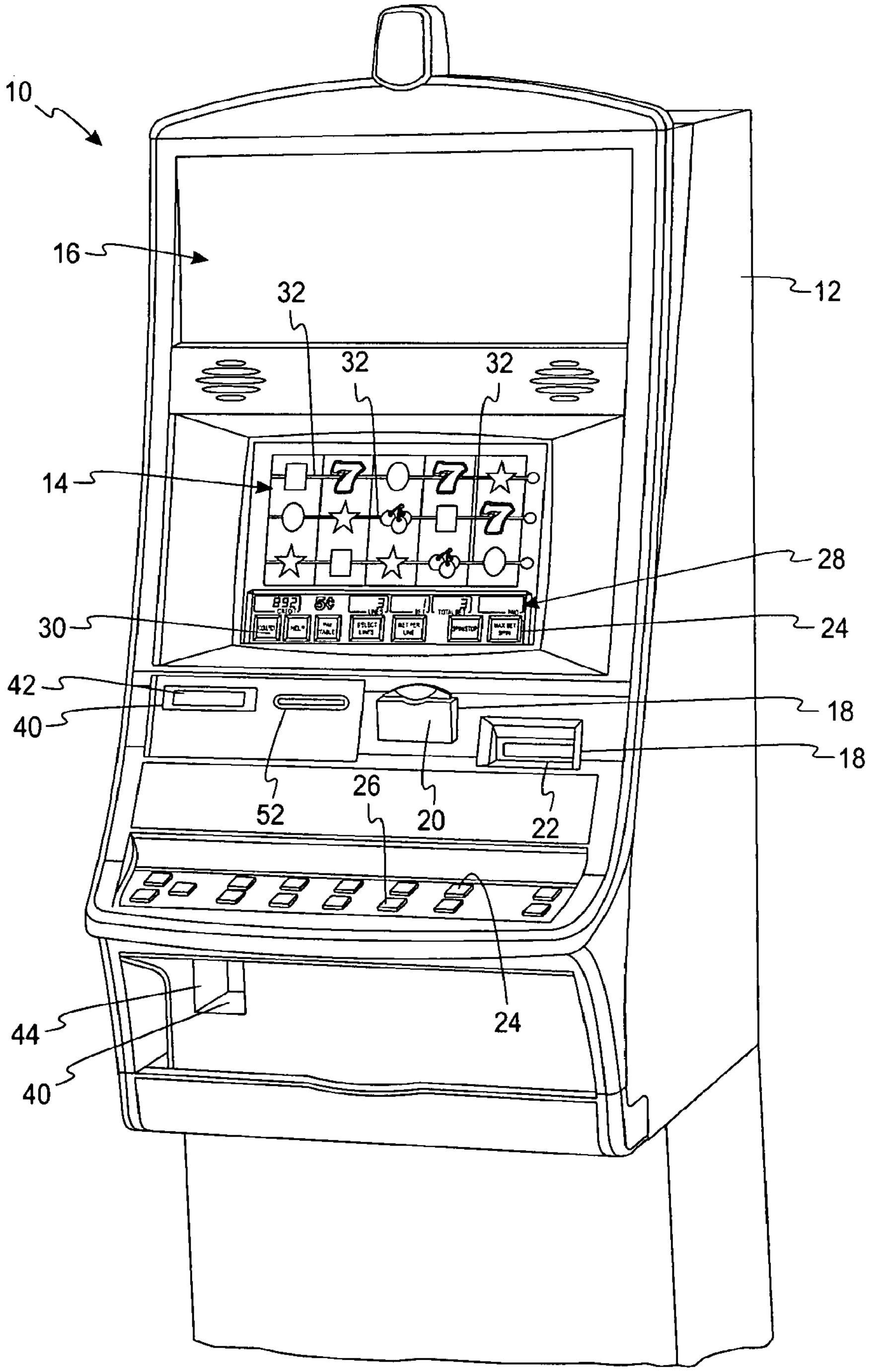
FIG. 1*a* is a perspective view of a free standing gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1*a*, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1*a*). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel.

The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1*a*, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. Alternatively, the primary display 14 of the gaming machine 10 may include a number of mechanical reels to display the outcome in visual association with at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1*a* as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 1B:
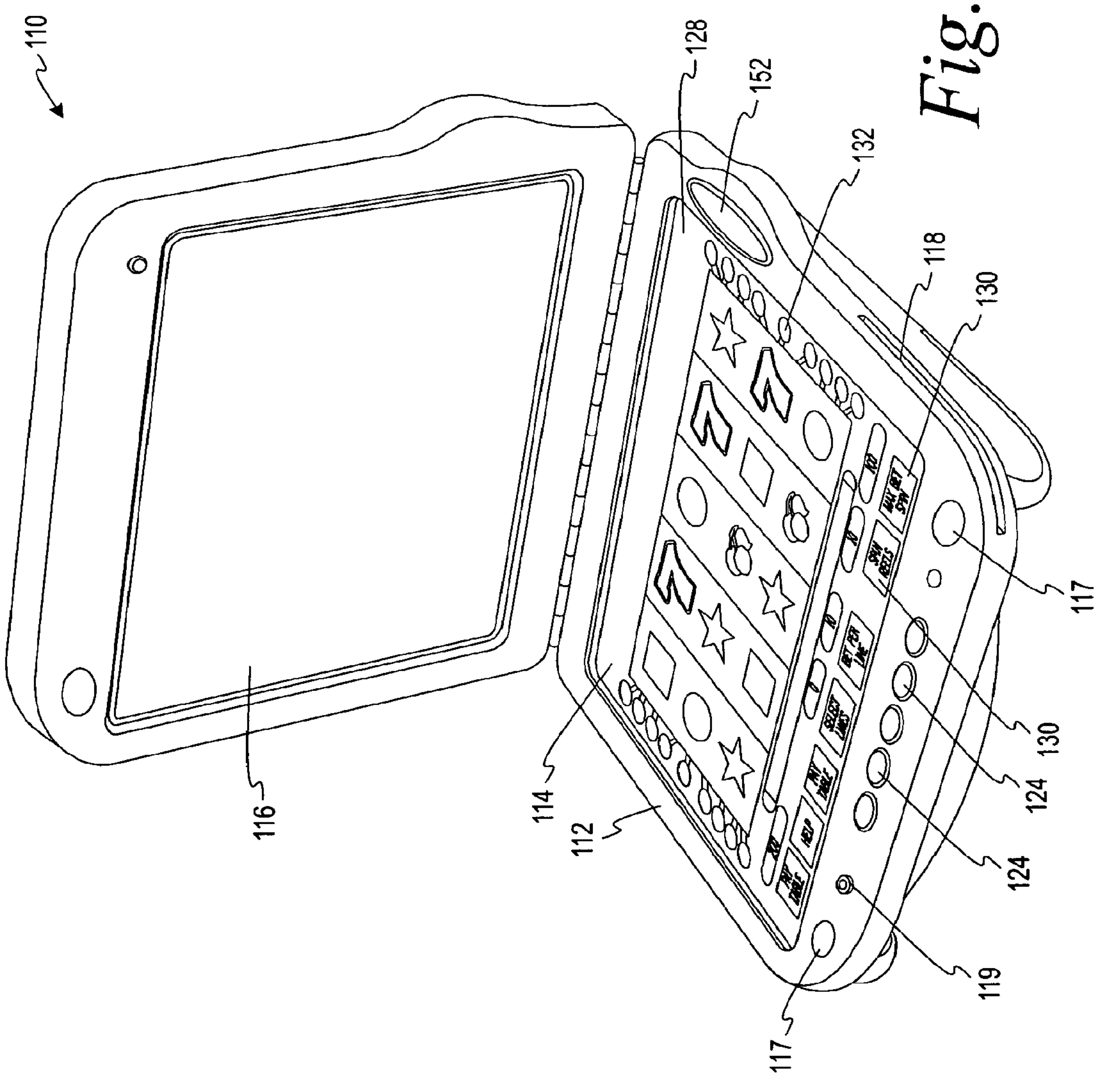
FIG. 1*b* is a perspective view of a handheld gaming machine embodying the present invention.

Depicted in FIG. 1*b* is a handheld or mobile gaming machine 110. Like the free standing gaming machine 10, the handheld gaming machine 110 is preferably an electronic gaming machine configured to play a video casino game such as, but not limited to, blackjack, slots, keno, poker, and roulette. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1*b*, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 may be provided remotely from the handheld gaming machine 110.

The player input device 124 comprises a plurality of push buttons on a button panel for operating the handheld gaming machine 110. In addition, or alternatively, the player input device 124 may comprise a touch screen 128 mounted to a primary display 114 and/or secondary display 116. In one aspect, the touch screen 128 is matched to a display screen having one or more selectable touch keys 130 selectable by a user's touching of the associated area of the screen using a finger or a tool, such as a stylus pointer. A player enables a desired function either by touching the touch screen 128 at an appropriate touch key 130 or by pressing an appropriate push button 126 on the button panel. The touch keys 130 may be used to implement the same functions as push buttons 126. Alternatively, the push buttons may provide inputs for one aspect of the operating the game, while the touch keys 130 may allow for input needed for another aspect of the game. The various components of the handheld gaming machine 110 may be connected directly to, or contained within, the casing 112, as seen in FIG. 1*b*, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the basic wagering game on the handheld gaming machine 110 is displayed to the player on the primary display 114. The primary display 114 can also display the bonus game associated with the basic wagering game. The primary display 114 preferably takes the form of a high resolution LCD, a plasma display, an LED, or any other type of display suitable for use in the handheld gaming machine 110. The size of the primary display 114 may vary from, for example, about a 2"-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player begins play of the basic wagering game on the handheld gaming machine 110 by making a wager (e.g., via the value input device 18 or an assignment of credits stored on the handheld gaming machine via the touch screen keys 130, player input device 124, or buttons 126) on the handheld gaming machine 110. In at least some aspects, the basic game may comprise a plurality of symbols arranged in an array, and includes at least one payline 132 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1*b*, comprises a biometric sensing device.

Figure 2:
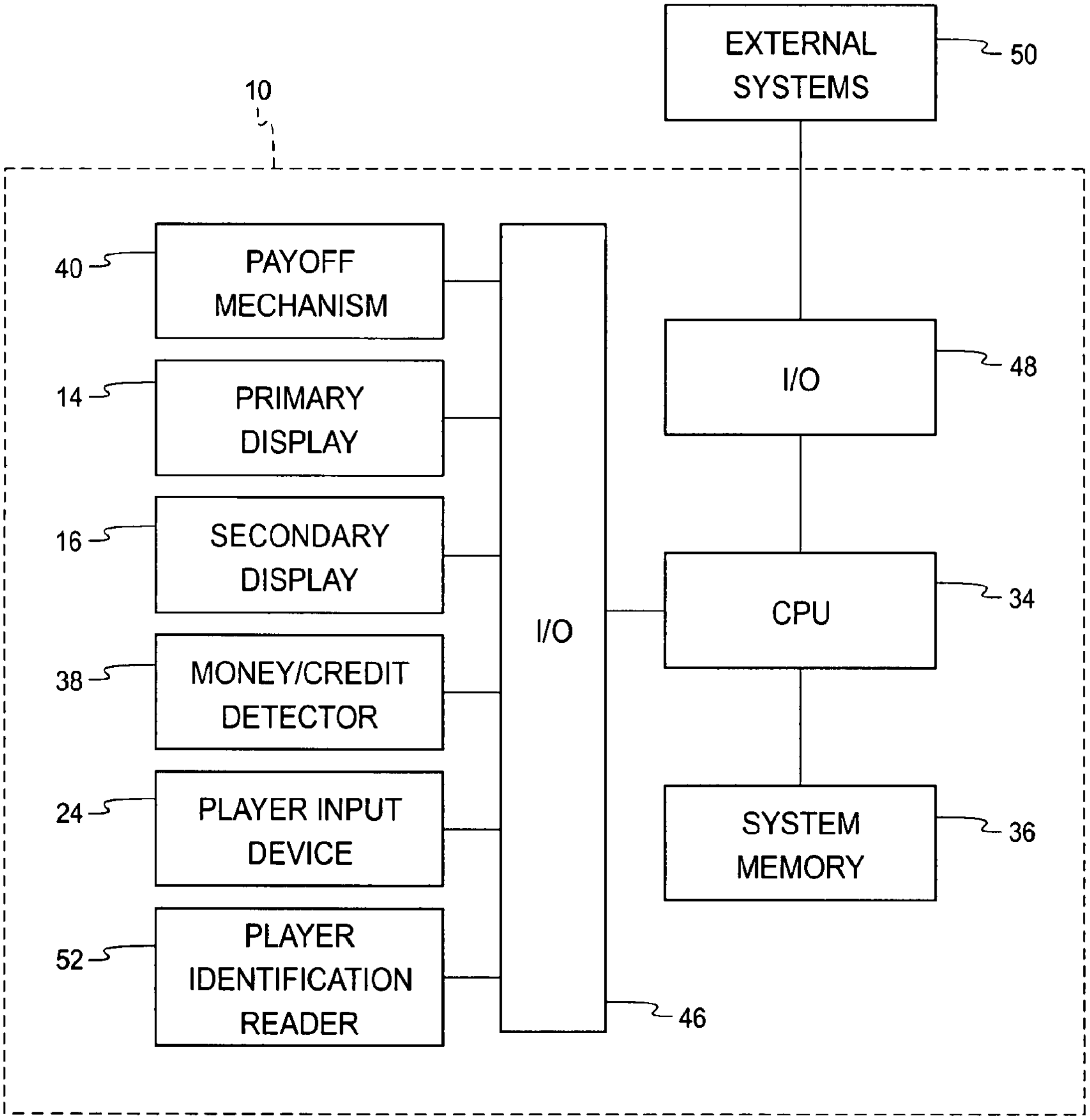
FIG. 2 is a block diagram of a control system suitable for operating the gaming machines of FIGS. 1*a* and 1*b*.

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1*a*, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10. The control system for a handheld gaming machine 110 may be similar to the control system for the free standing gaming machine 10 except that the functionality of the respective on-board controllers may vary.

The gaming machines 10,110 may communicate with external systems 50 (in a wired or wireless manner) such that each machine operates as a "thin client," having relatively less functionality, a "thick client," having relatively more functionality, or through any range of functionality therebetween. As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display(s) of the machine. In an alternative "rich client" configuration, the server determines game outcomes, while the controller 34 on board the gaming machine executes game code and processes display information to be displayed on the display(s) of the machines. In yet another alternative "thick client" configuration, the controller 34 on board the gaming machine 110 executes game code, determines game outcomes, and processes display information to be displayed on the display(s) of the machine. Numerous alternative configurations are possible such that the aforementioned and other functions may be performed onboard or external to the gaming machine as may be necessary for particular applications. It should be understood that the gaming machines 10,110 may take on a wide variety of forms such as a free standing machine, a portable or handheld device primarily used for gaming, a mobile telecommunications device such as a mobile telephone or personal daily assistant (PDA), a counter top or bar top gaming machine, or other personal electronic device such as a portable television, MP3 player, entertainment device, etc.

Figure 3:
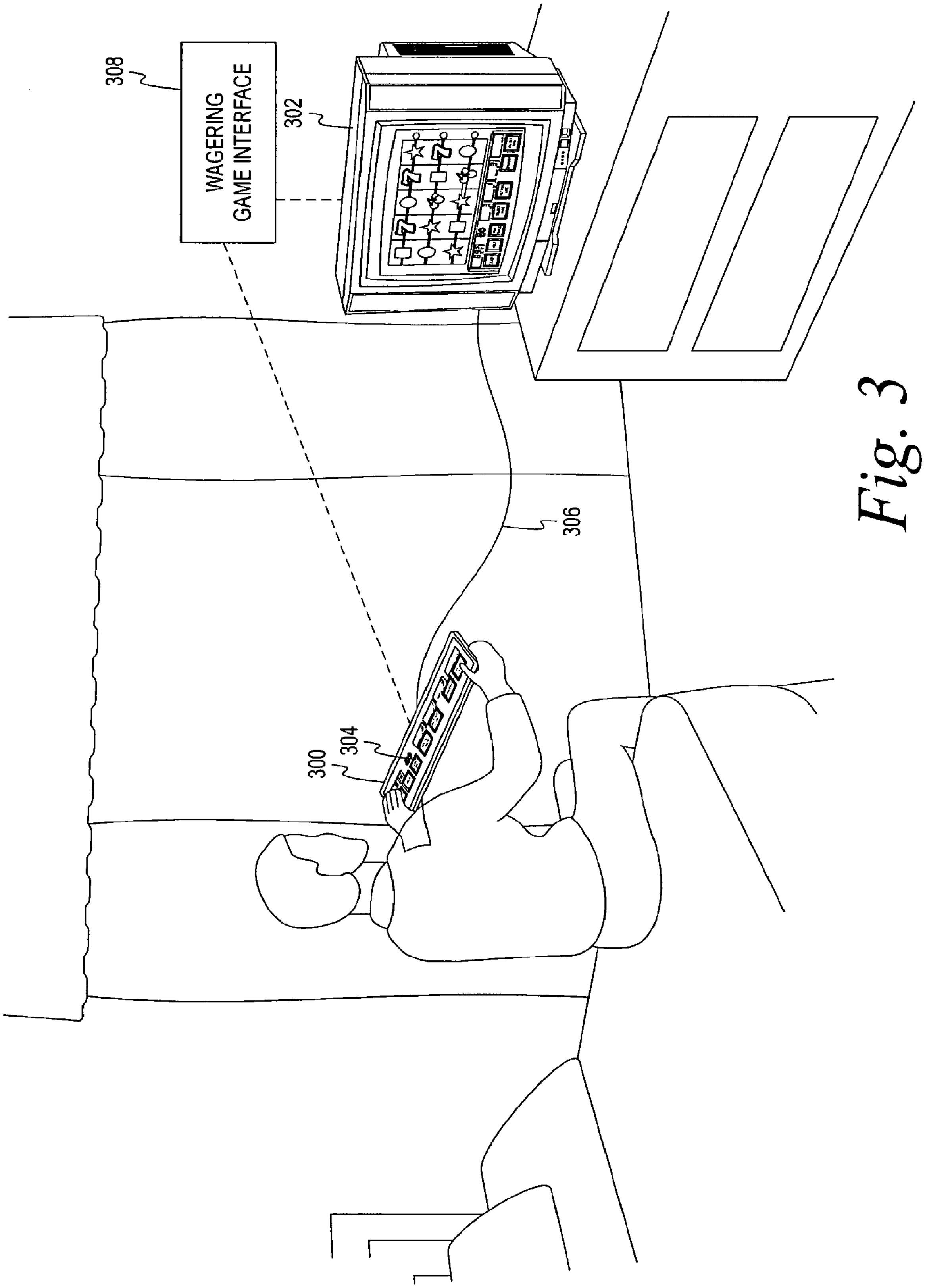
FIG. 3 is an illustration of a player conducting a wagering game on television set via a remote input device, according to one embodiment of the present invention.

Referring to FIG. 3, a touch screen device 300 is used as an ancillary controlling device, or remote input device, for controlling a display device 302, such as a television set, and includes a display area for displaying images such as input elements 304. The remote input device 300 is generally a handheld dummy terminal that includes an input-receiving area and/or an RNG. The display device 302 is a device that has not been used traditionally solely as a dedicated gaming machine 10, 110 (e.g., a slot machine located in a casino). Some examples of display devices 302 include television sets (which are conventionally used primarily for watching television), computer displays (which are conventionally used primarily for computing tasks), phones (which are conventionally used primarily for verbal communications), handheld devices (which are conventionally used primarily for mobile access to computer information), etc.

One distinction between the display device 302 and the dedicated gaming machine 10, 110 is that the display device 302 does not include player inputs (or switches) dedicated to providing input to the wagering games. For example, the dedicated gaming machine 10, 110 includes player inputs (e.g., one or more push-button 26, 126 and/or touch keys 30, 130) that are associated with corresponding functions of the wagering game (e.g., a touch key 30, 130 labeled "Spin" that activates a reel spinning function of the wagering game). In contrast, the display device 302 does not have any switches or buttons that are dedicated to providing input to the wagering game. For example, a television set is generally controlled only by a remote control. The television remote control does not include any buttons associated with wagering game functions. Further, even if the remote control can be programmed to activate functions of the wagering game (e.g., programming a "Channel Up" button of the remote control to activate a "Spin" function of the wagering game), the player will not have the same type of experience as if playing on the dedicated gaming machine. Specifically, the player will not readily recognize the television remote control as a dedicated remote input device for playing wagering games.

The touch screen device 300 is one example of a remote input device that is dedicated to controlling a display device 302 when playing a wagering game. The touch screen device 300 provides the player with an experience similar to playing on a dedicated gaming machine. Specifically, the touch screen device 300 includes touch keys 304 (also referred to as input elements) that are arranged such that they replicate the arrangement of touch keys 30, 130 of the dedicated gaming machine 10, 110. For example, the touch keys 304 of the touch screen device 300 have an arrangement that is similar, but not necessarily identical, to the arrangement of the touch keys 30, 130 of the dedicated gaming machine 10, 110. In another example, the touch keys 304 of the touch screen device 304 have a size and/or shape that is similar to the touch keys of the dedicated gaming machine. Thus, to replicate touch keys 30, 130 of the dedicated gaming machine 10, 110, the touch keys 304 of the touch screen device 300 have at least one common characteristic, e.g., shape, size, arrangement, location, color, feel, aspect ratio, etc.

The touch screen device 300 communicates with the display device 302 using an interface that uses a wired and/or a wireless connection. For example, the wired connection includes a universal serial bus ("USB") cable 306 and a dedicated cradle. The wireless connection includes, for example, infrared communication, Bluetooth® communication, and radio frequency communication.

The touch screen device 300 and/or the display device 302 are communicatively coupled to a wagering game interface 308 for conducting the wagering games. According to one embodiment, the wagering game interface 308 is generally a central network server that facilitates the playing of wagering games external to a gaming establishment (i.e., conducting wagering games in a physical location that is not an a casino floor). The touch screen device 300 and the display device 302 can be coupled to the wagering game interface 308 via a wired and/or wireless connection. For example, the display device 302 can be connected to the wagering game interface 308 via an interne connection provided by the same physical cable that is used to transmit television signals. In one example, the player can access the wagering game interface 308 by selecting a predetermined channel on the television set 302, e.g., selecting a WMS Gaming channel.

When using the touch screen device 300, the player experiences the same type of experience that he or she would experience if playing on the dedicated gaming machine 10, 110. For example, the player can wager by pressing a "Max Bet" touch key 304 similar to a "Max Bet" touch key 30, 130 on the dedicated gaming machine. If the player were to use a non-dedicated remote control, the player may need a reminder to press, for example, the "Volume Down" arrow to perform the "Max Bet" function. In another example, it is assumed that the player plays a bonus round in which he or she must select one or more objects from an array of objects. If the player uses the touch screen device 300, the player can simply touch the appropriate object of the array, which can be represented on the touch screen device 300. Alternatively, if the player uses a non-dedicated remote control, the player might have to use a combination of keys to select the desired object. For example, the player might have to use arrow keys to navigate through the array of objects and, when finally navigating to the desired object, the player must press an "Enter" key to select the desired object. Clearly, using the non-dedicated remote control can be a tedious and frustrating experience for the player.

The player can use the touch screen device 300 generally in any location where a display device 302 can communicate with a central gaming server. For example, a player may wish to play a wagering game in a bar that includes a plasma display, which is normally used for viewing television programming but can optionally be used to output audiovisual content of the wagering game. The plasma display can have the built-in capabilities to communicate with a central gaming server directly (e.g., via an Internet connection), or it can communicate with the central gaming server indirectly via an auxiliary device such as the touch screen device 300. The player can play a game of poker using solely the touch screen device 300. If a special event occurs, such as a $1 million bonus round, the player can use the plasma display to play the special event. Thus, instead of using a smaller display of the touch screen device 300, the player may use a much larger plasma display for the special bonus round. Alternatively, the plasma display may be required for a multi-player game, such as an eight-person tournament.

The touch screen device 300 can be configured so that the player can use the same touch screen device 300 for playing a plurality of different wagering games. For example, the player can use a first configuration (or template) for playing a slots wagering game and a second configuration for playing a video poker wagering game. The touch screen device 300 can have a slots mode, a video poker mode, and a custom mode. The player can easily select any setting. In custom mode, the player is permitted to design his or her own configuration for a personalized gaming experience. The custom mode can allow the player to upload and download video and audio content to further personalize the touch screen device 300. For example, the player can download poker cards images from a gaming server to change the appearance of the touch screen device.

Optionally, the touch screen device 300 can be configured so that the player can use the same touch screen device 300 for controlling other electronic items. For example, the touch screen device 300 can control a DVD player, a video game system (e.g., Microsoft Xbox, Sony Playstation, Nintendo Gamecube), a video cassette recorder (VCR), an audio receiver, a cable box, a satellite receiver, etc.

Figure 4:
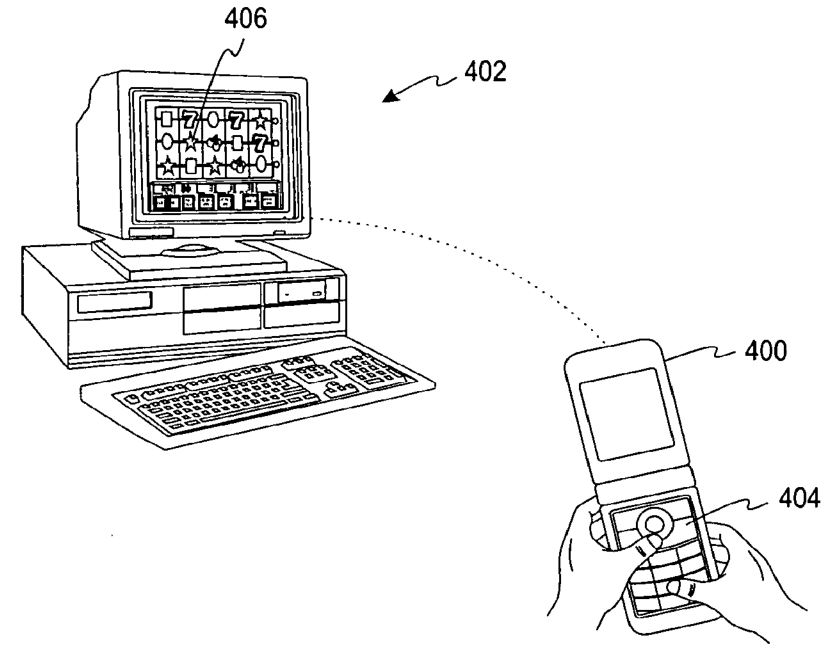
FIG. 4 is an illustration of a mobile phone used for conducting a wagering game on a personal computer system, according to another embodiment of the present invention.

Referring to FIG. 4, the player uses a mobile phone 400 to control a computer system 402. The mobile phone 400 can perform one or more functions of the remote input device 300 described above. The mobile phone 400 includes an integrated touch screen display 404 that displays a primary screen for performing traditional functions of the phone (e.g., receive a phone call). The touch screen display 404 of the mobile phone is programmed to display a secondary screen that replicates a touch screen display of a dedicated gaming machine. The player can alter the touch screen display 404 to show either the primary screen, which is used for phone functions, or the secondary screen, which is used for wagering functions. Using the mobile phone as a proxy, the player can play the wagering game on a larger non-touch screen display such as a computer screen 406 of the computer system 402 that lacks a touch screen display.

Figure 5:
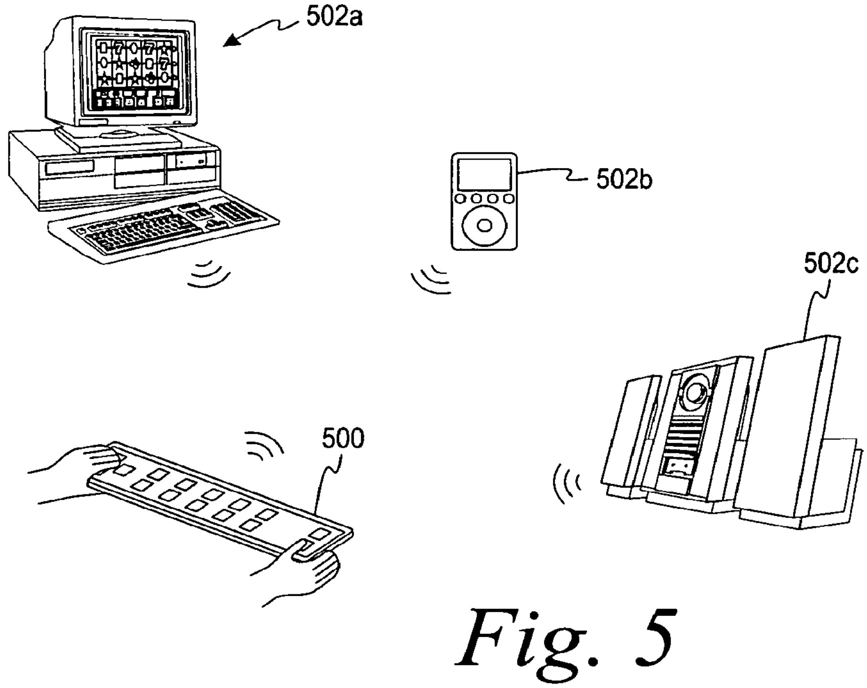
FIG. 5 is an illustration of a remote input device controlling input and/or output received from various audio sources, according to an alternative embodiment of the present invention.

Referring to FIG. 5, a remote input device 500 can perform one or more functions described above in reference to the remote input device 300, and it has been enhanced to provide audio input and/or output. Specifically, the remote input device 500 includes an interface area that transmits and/or receives audio signals. The audio signals can be digital signals and/or acoustic signals. The player can select a number of audio sources 502*a*-502*c* from which he or she can receive audio content. The remote input device 500 can have pre-stored audio content that is made available by the manufacturer or it can download audio content from such sources as the internet (e.g., via personal computers 502*a*). For example, the remote input device 500 can be connected to the internet to receive wagering audio content that is made available by a gaming manufacturer.

In another example, the remote input device 500 includes audio wagering content that is pre-encoded. For example, the pre-encoded content can include soundtracks, enhanced audio, multi-channel audio, etc. The audio wagering content can be decoded in response to the player satisfying one or more conditions, e.g., the player paying a nominal fee.

The remote input device 500 is programmed to decode encoded wagering audio content and make it available to the player, e.g., by outputting the audio content via an integrated speaker, wired headphones, wireless headphones, etc. Thus, the player can immerse himself or herslef into the wagering game by listening to the same wagering audio content that is generally available only on the floor of a gaming establishment. Alternatively, the player can select any other audio source 502*a*-502*c* for listening to any desired audio content. For example, the player can connect the remote input device 500 to an MP3® player 502*b*, such as an iPod®, to listen to his or her favorite tunes while playing the wagering game.

The player can select any of a number of audio output sources to listen to audio content provided in the remote input device 500. For example, the player can connect the remote input device to a headset or a speaker system 502*c*, or can listen via an integrated speaker (not shown) of the remote input device 500.

Figure 6:
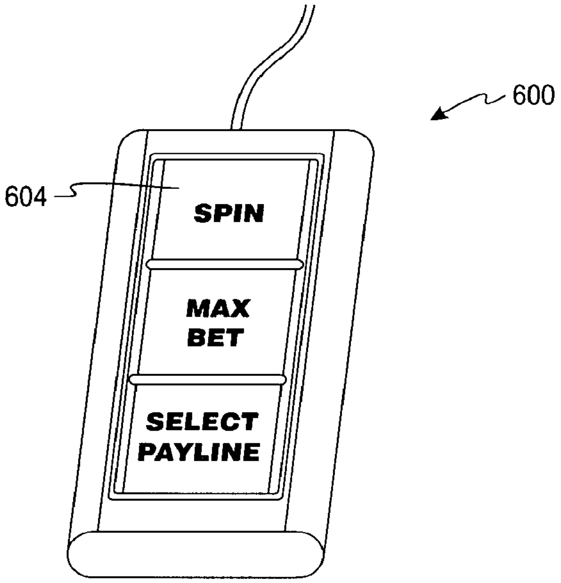
FIG. 6 is an illustration of a remote input device having an organic light-emitting diode display, according to an alternative embodiment of the present invention.

Referring to FIG. 6, a remote input device 600 is a three-button programmable button panel. The programmable button panel includes three keys 604, each key having an integral display for displaying a current function. The integral display my be comprised of LCD, electronic paper (e-paper), Organic Light-Emitting Diode ("OLED") or other suitable display technology. The images displayed on the keys can be oriented horizontally or vertically. The integral displays allow for the images of the respective functions to change in accordance with new functions selected by the player. For example, the integral displays can initially show a first set of images that are associated with a slots wagering game. If, subsequently, the player wishes to play a video poker game, the integral displays can change to a second set of images that are associated with the video poker game. Accordingly, the number and position of the keys 604 can be varied according to specific wagering functions of various wagering games.

Figure 7:
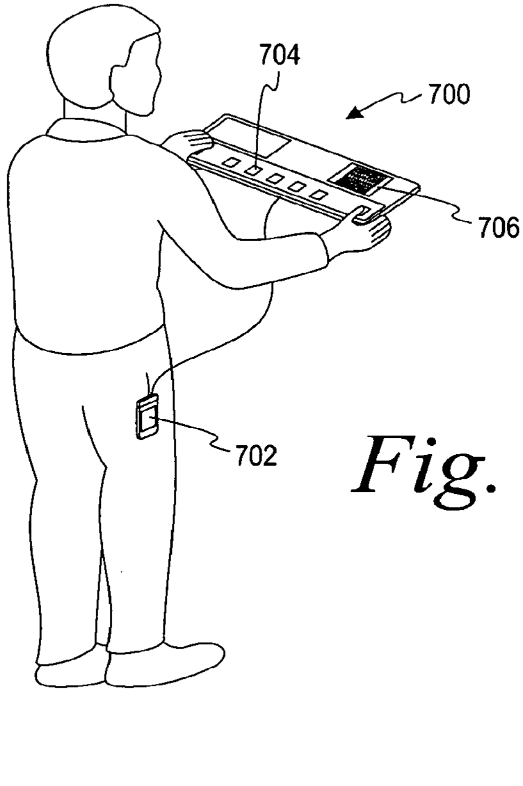
FIG. 7 is an illustration of a player conducting a wagering game using a mobile phone and a remote input device with an integrated display, according to an alternative embodiment of the present invention.

Referring to FIG. 7, a remote input device 700 includes a small keyboard that interfaces with a mobile phone 702 to play a wagering game. The remote input device 700 can perform one or more functions of the remote input device 300 described above in reference to FIG. 3. The mobile phone 702 is used to communicatively couple the remote input device 700 to a wagering game interface of a central gaming server such as the wagering game interface 308 described above.

During a wagering session, the keyboard 700 is held in the player's hands and the mobile phone 702 can be placed in the player's pocket. The keyboard includes a graphical display (such as an LCD display) and a plurality of touch keys 704 for playing a wagering game. The touch keys 704 of the LCD display are designed to replicate buttons for playing the wagering game. Thus, the keyboard 700 can be used by the player, instead of the buttons, to play the wagering game in a manner that is familiar to the player even if the player is not using the gaming machine.

Optionally, the keyboard 700 can include its own display 706 and its own Random Number Generator (RNG). For example, the keyboard 700 can display wagering content on its own display 706 in addition to or instead of displaying the wagering content on a display of a non-dedicated gaming machine. Similarly, the keyboard 700 can use an internal RNG in addition to or instead of using the RNG of a central gaming server.

The player can use the keyboard 700 anywhere, including in a gaming establishment such as a casino. For example, the keyboard 700 may be more convenient for a handicapped person that is uncomfortable with using a gaming machine. In fact, the player can customize the keyboard 700 such that the player will have no incentive for using buttons or touch keys of the gaming machine.

The remote input-device 700 may include a unique player identifier on a memory device for storing account information that is related to the player (e.g., player-tracking information, player personal information, player game statistics, etc.). For example, the player identifier can be a unique-encrypted identification card, similar to a mobile phone Single In-line Memory Module ("SIMM") card. The player can customize, or personalize, the remote input-device 700 to automatically show specific information. For example, when initially activated, the remote input device 700 can automatically show the player's name and his or her highest received awards.

Figure 8:
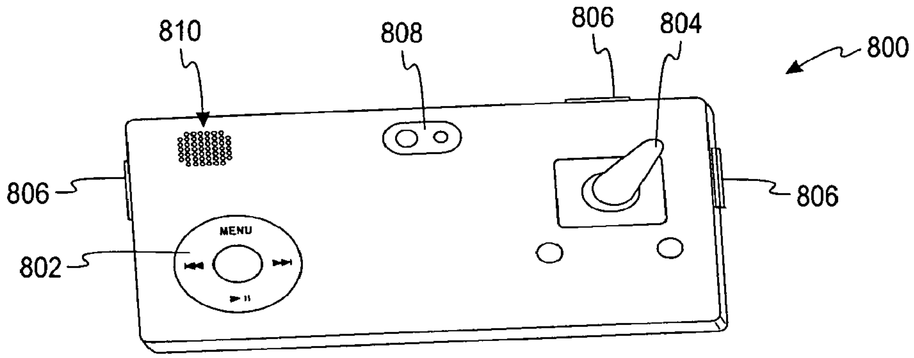
FIG. 8 is an illustration of a remote input device including a plurality of video and/or audio functions, according to an alternative embodiment of the present invention.

Referring to FIG. 8, a remote input device 800 includes one or more of a plurality of optional features in addition to being able to perform one or more of the functions described above in reference to the remote input device 300. The remote input device 800 includes a scroll wheel 802, a joystick 804, multi-sided buttons 806, vibration feedback, a video camera 808, and a microphone 810. The scroll wheel 802, the joystick 804, and the multi-sided buttons 806 provide different ways of receiving input from the player. For example, a player that is comfortable with using an iPod® player may be more comfortable with using the scroll wheel 802. Similarly, an avid video game player may be more comfortable with using the joystick 804 and/or the multi-sided buttons 806. The vibration feedback can provide a more immersing gaming experience for the player. For example, the remote input device 800 can vibrate every time the player spins a plurality of spinning reels.

In addition, the remote input device 800 can include the video camera 808 for recording and/or transmitting, for example, video images of the player to another player. Another option is the microphone 810 that can be used for recording and/or transmitting, for example, audio messages of the player to another player. In another example, the microphone 810 can also be used for voice commands to activate functions of the wagering game.

Figure 9:
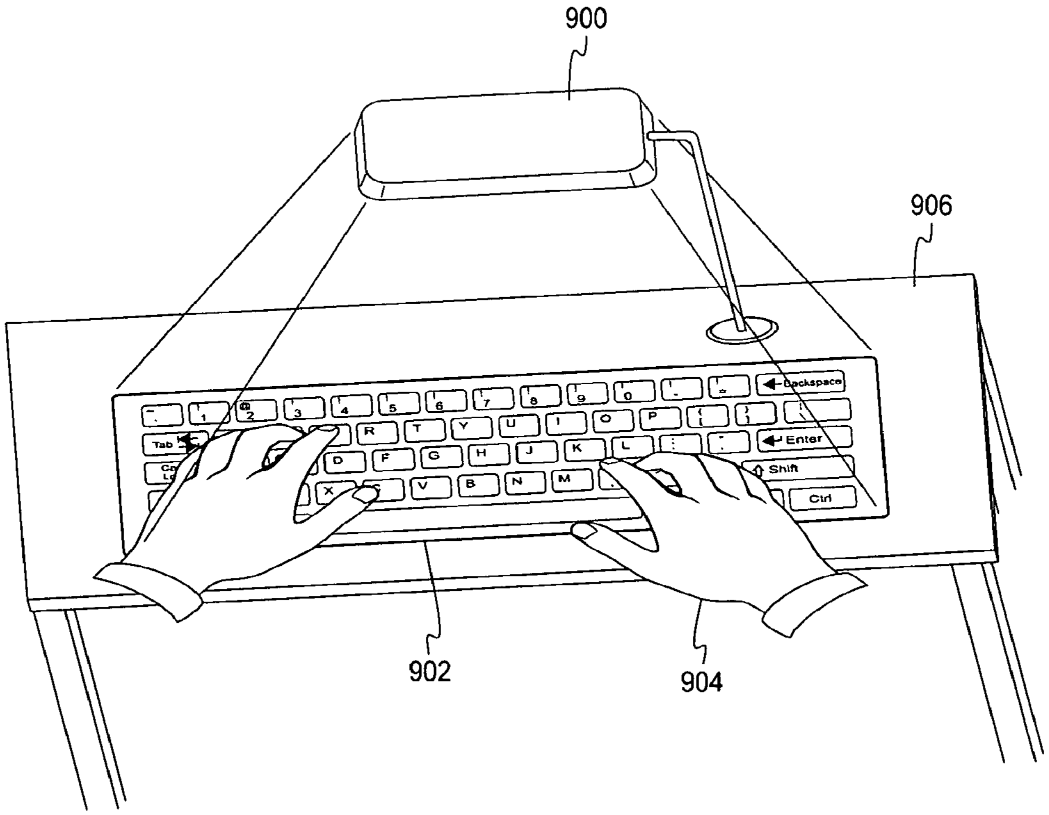
FIG. 9 is an illustration of a remote input device using a projected keyboard image for conducting a wagering game, according to an alternative embodiment of the present invention.

Referring to FIG. 9, a remote input device 900 includes a built-in projector for projecting an image 902 of a push-button panel, which can replicate, e.g., an image of a keyboard. The remote input device 900 can perform one or more of the functions described above in reference to the remote input device 300. The projected push-button panel 902 replicates one or more characteristics of a gaming machine push-button panel (e.g., number of buttons, arrangement of buttons, shape of buttons, size of buttons, color of buttons, etc.). An optical sensor 903 (e.g., a video camera) detects optical movement, such as fingers 904 simulating pushing the buttons, and generates signals for activating corresponding functions of the wagering game. The player can project the push-button panel image 902 generally on any surface, such as a table surface 906. Thus, the player can use the projected push-button panel 902 in addition to or instead of an input area of the remote input device 900 (e.g., a touch screen device) and the push-button panel of the gaming machine.

Figure 10:
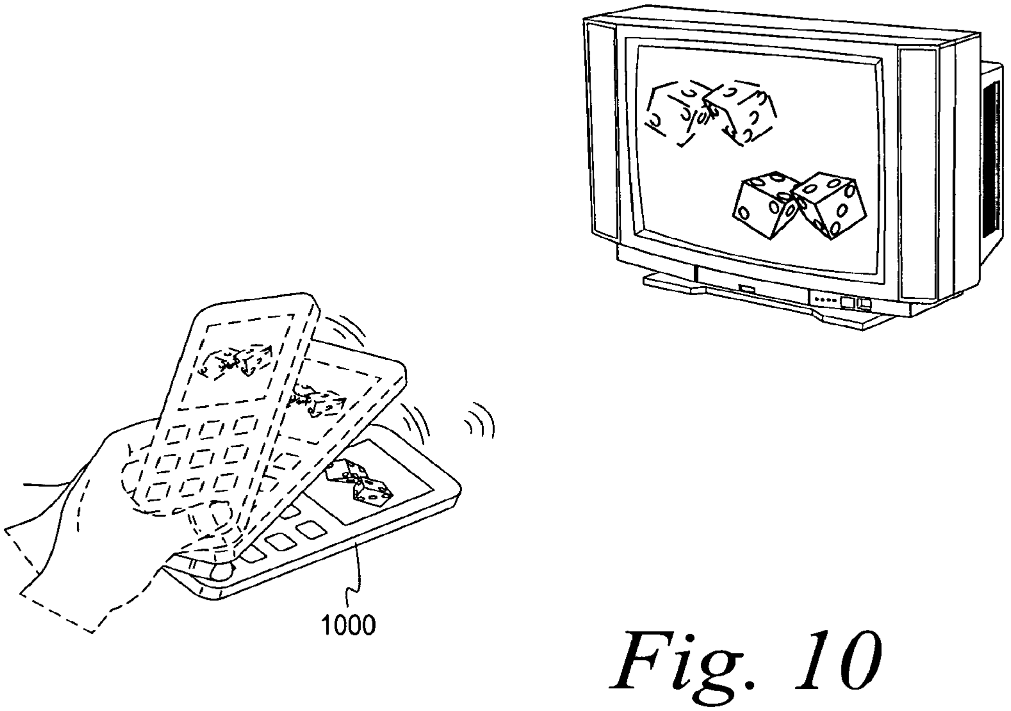
FIG. 10 is an illustration of a remote input device using gesture sensing for conducting a wagering game, according to an alternative embodiment of the present invention.

Referring to FIG. 10, a remote input device 1000 can perform one or more functions of the remote input device 300 and it is further enhanced to include a gesture sensing device that detects motion and directional movement of the remote input device 1000. The remote input device 1000 is connected to a display device, such as a television set, via a wireless or wired connection. The player can perform an action related to a wagering game by gesturing with the remote input device 1000. For example, when the player is required to throw a pair of dice, the player can flick the remote input device to simulate the throwing action of the pair of dice. In another example, the player can simulate the action of reeling-in a fish using fishing motions with the remote input device.

According to alternative embodiments, the remote input device described above in reference to FIGS. 3-10 can have other optional features. For example, the remote input device can be programmed to control other devices in addition to gaming machines. For example, the remote input device can be programmed to control a TV set, a computer, a stereo system, etc. Thus, the remote input device can be used as a universal remote input device. Each touch key or button of the remote input device can be programmed by the player by using, for example, a toolkit provided by a manufacturer. In another example, the remote input device includes a touch screen with tactile feedback to provide an appearance that touch keys of the touch screen are mechanical buttons. The remote input device can also include a built-in Internet browser so that the player can easily access the Internet, email messages, etc. Optionally, the remote input device can use a laser to identify items on a non-dedicate gaming device.

To encourage player loyalty, the remote input device can include locked features that are made available only if the remote input device is used with gaming machines of a specific manufacturer. For example, if the remote input device is used with gaming machines by WMS Gaming, Inc., the player can listen to Dolby® surround sounds instead of stereo surround sounds, the player can play an entire library of poker games instead of only four poker games, the player can access progressive and sweepstakes awards that are not available otherwise, etc. In other examples, the player can have access to enhanced video content only if using the remote input device. For example, the player can view wagering content rendered in real-time using a 3D rendering engine, instead of pre-rendered wagering content using basic 2D artwork. The remote input device can provide all features—and more—that are available on a particular gaming machine, e.g., gaming functions, marketing functions, player-tracking information, etc.

Figure 11:
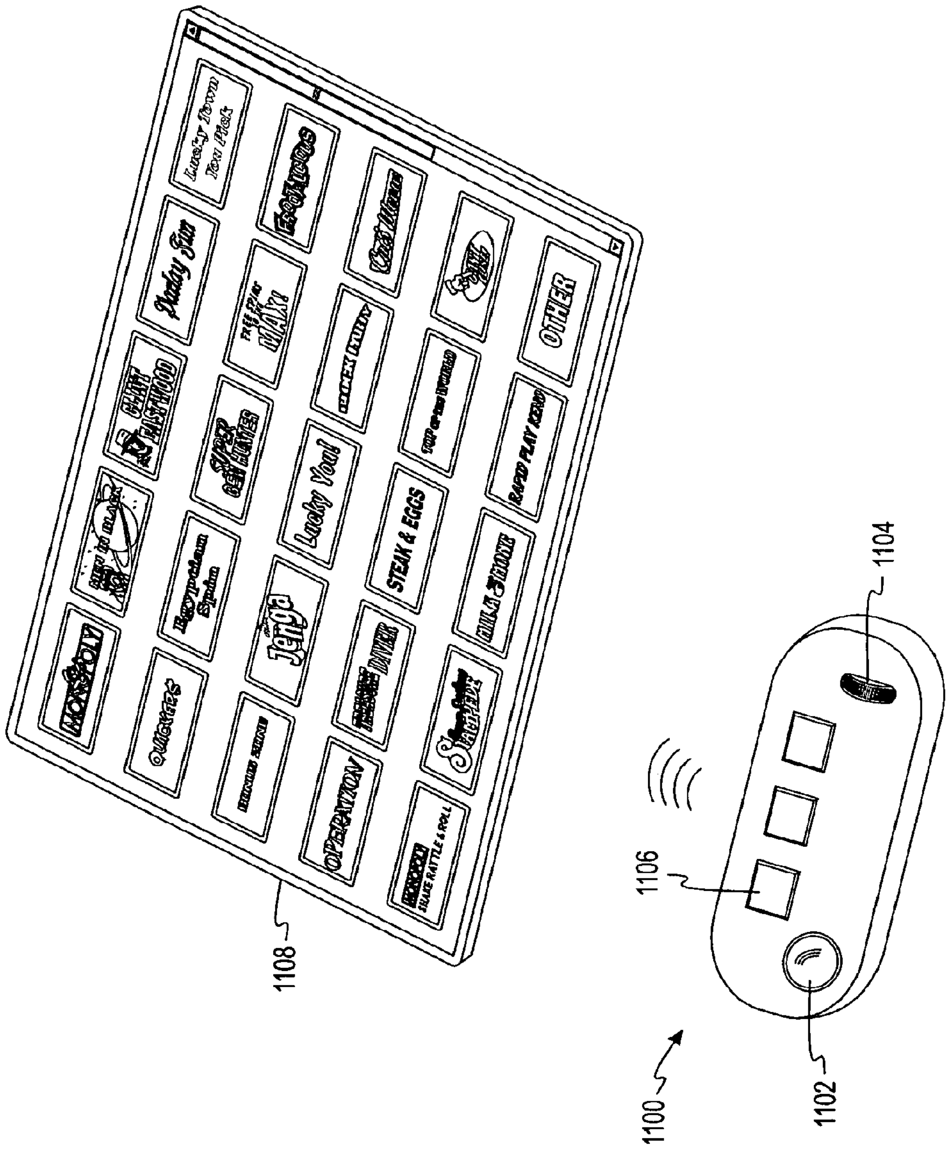
FIG. 11 is an illustration of a remote input device using a wheel for navigating a gaming menu, according to an alternative embodiment of the present invention.

Referring to FIG. 11, a remote input device 1100 can perform one or more functions of the remote input device 300 and it is further enhanced to include a scrolling ball 1102, a scrolling wheel 1104, and a plurality of touch keys 1106. The remote input device 1100 is used to conduct a wagering game displayed on a display device 1108.

The scrolling ball 1102 can be used to perform functions related to a wagering game, including functions related to navigating between options on a gaming menu. For example, the player can use the scrolling ball 1102 to navigate between a plurality of playable games on the display device 1108 when searching for a game. The scrolling ball 1102 can have a free-spin mode (also referred to as hyperfast scrolling) in which the player can rapidly navigate between a large number of options (e.g., hundreds of games). Optionally, the scrolling ball 1102 can have a click-to-click mode in which the player can precisely navigate from one option to a subsequent option. The player can switch between the free-spin mode and the click-to-click mode automatically. For example, the scrolling ball 1102 can include a sensor that detects the scroll speed and automatically switch between the two modes when a predetermined speed threshold is reached. Optionally, the player can press a button (such as a touch key 1106) to manually switch between the two modes.

The functions of the scrolling ball 1102 allow the player to navigate a menu of options in a fast and accurate manner. For example, the player is provided with a menu having thousands of game that can be selected for playing. The player can use the scrolling ball 1102 to rapidly navigate through the first few hundred games. However, when the player notices a game of interest, he or she can slow down the navigation and precisely select the game of interest. Other functions can be related to redeeming points, selecting bonus rounds, viewing previously played games, providing input during a game, etc.

The scrolling ball 1102 is located on a top surface of the remote input device 1100, near a left bottom corner. The location of the scrolling ball 1102 is preferably selected such that the player can operate the scrolling ball 1102 and hold the remote input device 1100 one-handed. For example, the player can hold the remote input device 1100 with his or her left hand such that the player's left thumb can be used to operate the scrolling ball 1102. Thus, the player has the right hand available for other functions (e.g., answer a mobile phone, input a selection on a touch display, input a wager, etc.).

The scrolling wheel 1104 is located opposite the scrolling ball 1102 for use with the right hand of the player. The scrolling wheel 1104 can perform one or more of the same functions as the scrolling ball 1102. Thus, if the scrolling wheel 1104 and the scrolling ball 1102 have the same functions, the remote input device 1100 can be, in general, used by either a left-handed or right-handed person.

According to alternative embodiments, only one of the scrolling wheel 1104 and the scrolling ball 1102 is located on the remote input device 1100. The location of the scrolling wheel 1104 and the scrolling ball 1102 can be located anywhere on the remote input device 1100 to allow the player to one-handedly hold the remote input device 1100 and operate the respective scrolling wheel 1104 and the scrolling ball 1102. For example, either one of the scrolling ball 1102 and the scrolling wheel 1104 can be located on a bottom surface of the remote input device 1100 or on a side surface such that the player can use any finger for operating the scrolling ball or the scrolling wheel 1104.

Each of these embodiments and obvious variations thereof is contemplated as falling within the spirit and scope of the claimed invention, which is set forth in the following claims.

What is claimed is:

1. An input device that interfaces with a display device to provide input signals for use in a wagering game being displayed on the display device, the display device being further operable to provide one or more non-gaming functions separately from and in addition to displaying the wagering game, the input device comprising:

a touch screen displaying a plurality of configurable input elements, the configurable input elements being operable to:

in response to a first wagering game being displayed on the display device and the display device lacking input elements solely dedicated to providing player inputs to the first wagering game, functionally and visually replicate a first set of corresponding first game input elements of a first dedicated gaming machine, including changing at least one of a relative position, a shape and a size of one or more of the configurable input elements to match the corresponding first game input elements;

in response to a second wagering game being displayed on the display device and the display device lacking input elements solely dedicated to providing player inputs to the second wagering game, functionally and visually replicate a second set of corresponding second game input elements of a second dedicated gaming machine, the second set being different from the first set, including changing at least one of a relative position, a shape and a size of one or more of the configurable input elements to match the corresponding second game input element; and in response to a player selecting one of the one or more non-gaming functions of the display device, at least functionally replicate at least one non-gaming device input elements corresponding to the selected non-gaming function of the display device; and an interface coupled to the configurable input elements, the interface transmitting signals directly to the display device in response to the player activating one of the first game, second game, and non-gaming input elements for either the non-gaming use of the display device or to play one of the first and second wagering games on the display device.

2. The input device of claim 1, wherein the display device is selected from a group consisting of a television set, a computer screen, and a phone, and the non-gaming input elements are selected from a group consisting of a television channel-changing control for changing television channels, a QWERTY keyboard for entering text, a DELETE key for deleting text or symbols, an ENTER key for issuing commands, and a SEND key for placing a telephone call or text message.

3. The input device of claim 1, wherein the interface provides a wireless connection.

4. The input device of claim 3, further comprising a mobile telephone including a motion sensor and a video display, wherein a player input of moving the telephone corresponds to a meaningful player action in the wagering game, and wherein the player input is detected by the motion sensor and displayed by the video display as an image of the meaningful action, and wherein the interface transmits signals to the display device to display a similar image of the meaningful action in the wagering game.

5. The input device of claim 1, wherein the configurable input elements functionally and visually replicate at least one of a pushbutton and a touch key input element that initiates a reel-spinning function on a first dedicated gaming machine.

6. The input device of claim 1, further comprising an output device selected from a group consisting of an integrated speaker, wired headphones, and wireless headphones.

7. The input device of claim 1, further comprising a microphone integrated in a housing of the input device for receiving audio signals.

8. The input device of claim 1, further comprising a video camera integrated in a housing of the input device for receiving video images.

9. A method for implementing dual use of a display device that is operable to provide one or more non-gaming functions separately from and in addition to displaying a wagering game, the wagering game being conducted on the display device via a remote input device, the display device operable to display outcome images of a randomly selected outcome and input images associated with the wagering game, the remote input device including a touch screen displaying a plurality of configurable input elements for providing input to the wagering game, the method comprising:

in response to a first wagering game being displayed on the display device and the display device lacking input elements solely dedicated to providing player inputs to the first wagering game, functionally and visually replicating, via the configurable input elements, a first set of corresponding first game input elements of a first dedicated gaming machine, including changing at least one of a relative position, a shape and a size of one or more of the configurable input elements to match the corresponding first game input elements;

in response to a second wagering game being displayed on the display device and the display device lacking input elements solely dedicated to providing player inputs to the second wagering game, functionally and visually replicate, via the configurable input elements, a second set of corresponding second game input elements of a second dedicated gaming machine, the second set being different from the first set, including changing at least one of a relative position, a shape and a size of one or more of the configurable input elements to match the corresponding second game input elements;

in response to a player selecting one of the one or more non-gaming functions of the display device, reconfiguring the configurable input elements to at least functionally replicate at least one non-gaming device input element corresponding to the selected non-gaming function of the display device; and transmitting signals from the remote input device to the display device in response to the player activating any of the first game, second game, and non-gaming inputs associated with the non-gaming use, the first game, or the second game.

10. The method of claim 9, further comprising connecting the input device to the display device using a wireless connection.

11. The method of claim 10, wherein the remote input device comprises a mobile telephone including a motion sensor and a video display, wherein a player input of moving the telephone corresponds to a meaningful player action on the first dedicated gaming machine, the player input being detected by the motion sensor and displayed by the video display as an image of the meaningful action, and wherein operating the display device to conduct the first wagering game further comprises transmitting signals from the mobile telephone to the display device to display a similar image of the meaningful action in the first wagering game.

12. The method of claim 9, further comprising displaying the plurality of configurable input elements of the input device as sequentially ordered buttons, the buttons corresponding to the first game input elements of the first dedicated gaming machine.

13. The method of claim 9, further comprising identifying the player of the input device with a unique identifier.

14. The method of claim 9, wherein the configurable input elements functionally and visually replicate at least one of a pushbutton and a touch key input element that initiates a reel-spinning function on a first dedicated gaming machine.

15. The method of claim 9, wherein the one or more non-gaming functions include a function associated with an electronic item selected from a group consisting of a television set, a DVD player, a cable box, an audio receiver, and a video cassette recorder.

16. A gaming system for playing wagering games remotely via a display device, the gaming system comprising:

a display device operable to display images of a randomly selected outcome of a wagering game and further operable to provide one or more non-gaming functions separately from and in addition to displaying the wagering games, the display device lacking input elements solely dedicated to providing player inputs to the wagering games; and a remote input device comprising a touch screen displaying a plurality of configurable input elements operable to:

in response to a first wagering game being displayed on the display device, functionally and visually replicate corresponding first game input elements on a first dedicated gaming machine, including changing at least one of a relative position, a shape and a size of one or more of the input touch keys to match the corresponding first game input element;

in response to a second wagering game being displayed on the display device, functionally and visually replicate corresponding second game input elements of a second dedicated gaming machine, including changing at least one of a relative position, a shape and a size of one or more of the input touch keys to match the corresponding second game input elements; and in response to a player selecting one of the one or more non-gaming functions of the display device, at least functionally replicating non-gaming device input elements corresponding to the selected non-gaming function of the display device; and an interface coupled to the configurable input elements that transmits signals associated with the input touch keys directly to the display device.

17. The wagering system of claim 16, wherein the configurable input elements functionally and visually replicate at least one of a pushbutton and a touch key input element that initiates a reel-spinning function on a first dedicated gaming machine.

18. The wagering system of claim 16, wherein the interface further receives signals from the display device.

19. The wagering system of claim 16, wherein the remote input device includes an integrated area displaying at least some of the images of the first and second wagering games.

20. The wagering system of claim 16, wherein the display device is selected from a group consisting of a television set, a computer screen, and a phone, and the non-gaming input elements are selected from a group consisting of a television channel-changing control for changing television channels, a QWERTY keyboard for entering text, a DELETE key for deleting text or symbols, an ENTER key for issuing commands, and a SEND key for placing a telephone call or text message.

21. A machine-readable, non-transitory medium operating with a gaming system that includes a display device operable to provide non-gaming functions separately from and in addition to displaying a wagering game, an input device having a touch screen displaying a plurality of configurable input elements, and an interface coupled to the configurable elements, the machine-readable medium including instructions that, when executed by one or more processors, cause at least one of the one or more processors to operate with the gaming system to perform a method comprising:

displaying a randomly selected outcome as part of a first wagering game on the display device;

in response to displaying the first wagering game on the display device and the display device lacking input elements solely dedicated to providing player inputs to the first wagering game, functionally and visually replicating, via at least one of the plurality of configurable input elements, a first set of first game input elements of a first dedicated gaming machine, including changing at least one of a relative position, a shape, and a size, of one or more of the configurable input elements to match a corresponding first game element;

displaying a randomly selected outcome as part of a second wagering game on the display device;

in response to displaying the second wagering game on the display device and the display device lacking input elements solely dedicated to providing player inputs to the second wagering game, functionally and visually replicating, via at least one of the plurality of configurable input elements, a second set of second game input elements of a second dedicated gaming machine, the second set being different from the first set, including changing at least one of a relative position, a shape, and a size, of one or more of the configurable input elements to match a corresponding second game element;

detecting a selection by a player of one of the one or more non-gaming functions of the display device;

in response to a player selection of one of the one or more non-gaming functions of the display device, reconfiguring at least one of the plurality of configurable elements to at least functionally replicate a non-gaming device input element corresponding to the selected non-gaming function of the display device; and transmitting signals, via the interface, from the input device to the display device in response to the player activating any of the first game, second game, and non-gaming input elements associated with the first wagering game, the second wagering game, or the one or more non-gaming functions of the display device.

22. The machine-readable medium of claim 21, wherein the display device is selected from a group consisting of a television set, a computer screen, and a phone, and the non-gaming input element is selected from a group consisting of a television channel-changing control for changing television channels, a QWERTY keyboard for entering text, a DELETE key for deleting text or symbols, an ENTER key for issuing commands, and a SEND key for placing a telephone call or text message.

23. The gaming system of claim 21, wherein the configurable input elements functionally and visually replicate at least one of a pushbutton and a touch key input element that initiates a reel-spinning function on a first dedicated gaming machine.

* * * * *